United States Patent [19]

Wielers

[11] Patent Number: 5,057,474

[45] Date of Patent: Oct. 15, 1991

[54] PREPARATION AND USE OF METAL-CONTAINING ZEOLITIC CATALYSTS

[75] Inventor: Antonius F. H. Wielers, Amsterdam, Netherlands

[73] Assignee: Shell Oil Company, Houston, Tex.

[21] Appl. No.: 522,702

[22] Filed: May 14, 1990

[30] Foreign Application Priority Data

Jul. 13, 1989 [GB] United Kingdom ............... 8916103

[51] Int. Cl.$^5$ .......................... B01J 29/20; B01J 37/00
[52] U.S. Cl. ...................................... 502/74; 502/60; 502/66; 502/78; 502/86
[58] Field of Search ..................... 502/66, 74, 78, 86, 502/60

[56] References Cited

U.S. PATENT DOCUMENTS

| | | | |
|---|---|---|---|
| 3,213,013 | 10/1965 | Arey, Jr. ................................. | 502/74 |
| 3,259,564 | 7/1966 | Kimberlin, Jr. ....................... | 502/78 |
| 3,404,086 | 10/1968 | Plank et al. ........................... | 502/86 |
| 3,405,055 | 10/1968 | Bittner ................................... | 502/86 |
| 3,442,794 | 5/1969 | Van Helden et al. ................. | 502/86 |
| 3,644,200 | 2/1972 | Young .................................... | 502/78 |
| 3,692,692 | 9/1972 | Ward et al. ............................ | 502/66 |
| 4,029,719 | 6/1977 | Forni ...................................... | 260/683.15 |
| 4,121,996 | 10/1978 | Hilfman ................................. | 502/78 |
| 4,359,409 | 11/1982 | de Otter ................................. | 502/78 |
| 4,536,485 | 8/1985 | Topp-Jorgensen ................... | 502/86 |
| 4,735,929 | 4/1988 | Bakas et al. ........................... | 502/78 |

FOREIGN PATENT DOCUMENTS 87221478 12/1986 Australia .
2471359 6/1981 France ................................. 502/78

Primary Examiner—Carl F. Dees

[57] ABSTRACT

Metal-containing zeolitic catalysts, for use in hydrocarbon conversion processes, are prepared by a process which comprises exposing a zeolitic base material, optionally after introduction of metal ions, to adsorb thereon ammonia or a gaseous lower amine, followed by contacting the zeolitic base material containing adsorbed ammonia or amine with an aqueous solution of a salt of the desired metal with a strong acid at a temperature at which adsorbed ammonia or amine is released.

8 Claims, No Drawings

PREPARATION AND USE OF METAL-CONTAINING ZEOLITIC CATALYSTS

FIELD OF THE INVENTION

This invention relates to the preparation and use in hydrocarbon conversion processes of metal-containing zeolitic catalysts.

BACKGROUND OF THE INVENTION

Zeolitic catalysts have found application in many hydrocarbon conversion processes, such as hydrocracking, isomerization and oligomerization. An example of such a process is the oligomerization of an olefinic hydrocarbon-containing feedstock in the presence of a mordenite type catalyst loaded with transition metal ions, such as nickel ions. The use of such catalysts is described in European Patent Application No. 233382. While it is acknowledged therein that the metal-containing mordenite catalyst may be prepared by incorporating the metal ions by any suitable ion exchange method, in practice such catalysts have been prepared by treating the mordenite-type carrier material, which contains exchangeable cations, e.g. ammonium ions, with a solution of a salt of the desired metal under neutral to basic conditions, for example using nickel acetate. While this ion exchange route undoubtedly leads to the preparation of a satisfactory catalyst for the oligomerization of lower olefins, the concentrated solutions of nickel acetate required for the preparation are difficult to handle and, in particular, are unstable and flocculate on standing. However, attempts to use an acidic solution, of nickel nitrate, for introduction of the nickel to the mordenite proved unsuccessful in that poor metal loading was achieved and the resulting catalyst had lower stability than the catalyst prepared by the acetate route.

Surprisingly, we have found that it is possible to prepare such catalysts with adequate metal loading using an acidic metal solution and thus overcome the problems associated with materials such as nickel acetate. Even more surprisingly, we have found that it is possible to prepare such catalysts having a mordenite base, with enhanced activity in the oligomerization of olefins.

SUMMARY OF THE INVENTION

According to the present invention there is provided a process for the preparation of a metal-containing zeolitic catalyst comprising the steps of exposing a zeolitic base material, optionally after initial introduction of metal ions, to ammonia or a gaseous lower amine during a time sufficient to allow adsorption of said ammonia or amine to occur and contacting the zeolitic base material containing adsorbed ammonia or amine with an aqueous solution of a salt of the desired metal with a strong acid at an elevated temperature sufficient to release adsorbed ammonia or amine.

DETAILED DESCRIPTION OF THE INVENTION

The zeolitic base material can be any zeolite-comprising material conventionally used as a catalyst base in hydrocarbon conversion processes. The term zeolite in this specification is not to be regarded as comprising only crystalline aluminium silicates. The term also includes crystalline silica (silicalite), chromsilicates, gallium silicates, iron silicates, titanium aluminosilicates and iron aluminosilicates. Examples of zeolites that may be used in this invention include aluminium silicates such as faujasite, mordenite, erionite, ferrierite, theta and the ZSM-type zeolites such as ZSM-5, ZSM-11, ZSM-12, ZSM-35, ZSM-23 and ZSM-38 and mixtures thereof. A preferred base material comprises a mordenite type of zeolite. While the zeolite will usually be an aluminosilicate, other trivalent metals may be present in the structure, such as one or more metals selected from iron, gallium, rhodium, chromium and scandium. The molar ratio of $SiO_2$ to trivalent metal oxide in the zeolite is suitably in the range of from 2 to 1000.

The base material may be used alone or in combination with a binder material. Suitable binder materials are selected from refractory oxides (such as alumina, silica, magnesia, zirconia and titania), clay and/or carbon.

The zeolitic base material is suitably in a form containing exchangeable cations, e.g. alkali metal, hydrogen or ammonium cations.

The zeolitic base material is exposed to ammonia or a gaseous lower amine. Ammonia is preferred. The lower amines will have individual hydrocarbyl substituents with carbon numbers of four or less. Preferably temperatures at or near room temperature are employed, although elevated temperatures, e.g. up to 200° C., can be used. The exposure time can vary widely but the time should be sufficient to ensure that the ammonia or amine is adsorbed by the zeolite. Times of from 1 to 5 hours have been found to be sufficient when using ammonia. The adsorption is exothermic and thus the saturation point can be determined by monitoring the temperature increase and subsequent fall in temperature.

The zeolitic base material containing the adsorbed ammonia or amine is then contacted, preferably immediately, with an aqueous salt solution of the desired metal. The concentration of the solution is not critical, but is preferably in the range of from 0.01 to 1 M. The metal is preferably a transition metal, preferably selected from Group 1b or 8 of the Periodic Table of the Elements (as published in the "Handbook of Chemistry and Physics", 55th edition (1975), CRC Press, OH, USA). Preferred metals are nickel and cobalt.

The salt is a salt of the metal with a strong acid. Suitable salts are sulphates, halides and, in particular, nitrates. Mixtures of metal salts may be employed.

The contacting with the metal salt is carried out at a temperature sufficient to release adsorbed ammonia or amine, for example from 25° C. to 110° C., preferably from 70° to 90° C. when using ammonia, for a time of suitably 0.5 to 48 hours, preferably 4 to 16 hours.

If desired, the zeolitic base material may have been subjected to initial metal loading, suitably by ion exchange with an aqueous salt solution of the desired metal, prior to exposure to ammonia or amine. Preferably the initially loaded catalyst is calcined prior to exposure to ammonia or amine and subsequent further ion exchange.

In one form of the invention, the steps of exposure to ammonia or amine and ion exchange are repeated at least twice, preferably with calcining before the subsequent exposure step. In this way it has been found possible to tailor the metal loading of the catalyst base for the subsequent application. The amount of metal loaded onto the zeolitic base is preferably from 5 to 15% w.

After completion of the loading of the zeolitic base with the metal, the catalytically active composition thus obtained is preferably dried and calcined before being employed as catalyst. Drying is suitably carried out at a temperature from 100° to 400° C., for a period of 1 to 24 hours. The calcination temperature is suitably from 400° to 800° C. and the calcination treatment is suitably carried out at subatmospheric, atmospheric or elevated pressure for a period of 0.1 to 24 hours in air or an inert atmosphere.

The invention also includes metal-containing zeolitic catalysts prepared by the above process and the use of such catalysts in hydrocarbon conversion processes. A preferred hydrocarbon conversion process is the preparation of liquid hydrocarbons from an olefinic feed at elevated temperature and pressure using the above-described catalyst. A preferred catalyst for this application comprises mordenite loaded with nickel ions.

A wide variety of olefinic hydrocarbons-containing feeds can be employed in the olefin conversion process, provided that the dimensions of the olefinic hydrocarbon molecules are such that they can be catalytically converted with a mordenite-type of catalyst.

Alpha-olefins, and in particular alpha-mono olefins are preferably used as feed (components). However, internal olefins such as butene-2, which may be isomerized at the prevailing process conditions, are also suitably used as feed (components). Preferably, the feed contains more than 50% by weight of olefins having at most six carbon atoms per molecule ($C_6^-$ olefins) such as ethene, propene, n-butenes, isobutene, n-pentenes, isopentenes, n-hexenes and isohexenes; in addition to said olefins, aliphatic hydrocarbons such as (cyclic) paraffins, di-olefins and mono-olefins having more than six carbon atoms per molecule can be present in the feed.

Special preference is given to ethene- and/or propene-containing feeds which are suitably obtained as by-product from (fluid) catalytic cracking processes, thermal cracking processes (e.g. for the preparation of ethene), coking- and/or pyrolysis processes.

Suitable feeds for the olefin-conversion process can also be prepared starting from synthesis gas which is first converted into methanol and subsequently into a product substantially consisting of $C_6^-$ olefins. Alternatively, the synthesis gas can be converted in the presence of a Fischer-Tropsch type of catalyst into a product which in addition to paraffinic hydrocarbons contains a considerable amount of $C_6^-$ olefins.

The olefin-conversion process is preferably carried out at a temperature from 150°–330° C., a pressure from 1–100 bar abs. and a space velocity from 0.1–10 kg feed/kg catalyst.hour. Most preferably, the process is carried out at a temperature from 180°–300° C., a pressure from 10–50 bar abs. and a space velocity from 0.2–5 kg feed/kg catalyst.hour.

The olefin-conversion process can be carried out in one or more fixed-, moving- and/or fluidized beds; preferably, the process is carried out in a fixed bed of catalyst particles such as extrudates, pellets or spheres passing sieve openings having a width from 0.05–5 mm, and preferably from 0.1–1 mm.

The invention also includes liquid hydrocarbons prepared by a process as described above. Such liquid hydrocarbons include products boiling in the gasoline range (40°–150° C.), the middle distillate range (kerosene- and gas oil-fractions boiling from 150°–370° C.) and in the lubricating base oil range (above 370° C.). Products boiling below the gasoline boiling range and unconverted feed, if any, are preferably separated off from the normally liquid products and can be recycled, if desired.

The ranges and limitations provided in the instant specification and claims are those which are believed to particularly point our and distinctly claim the instant invention. It is, however, understood that other ranges and limitations that perform substantially the same function in substantially the same way to obtain the same or substantially the same result are intended to be within the scope of the instant invention as defined by the instant specification and claims.

The invention will be described by the following examples which are provided for illustrative purposes and are not be construed as limiting the invention.

EXAMPLE 1

Preparation of catalysts

Catalysts A and B were prepared from mordenite in the ammonium form with a silica/alumina molar ratio of 17 by first exchanging the ammonium mordenite with 1 M Ni(NO$_3$)$_2$ solution during 1 hour at 90° C. The nickel loaded zeolite was calcined at 500° C. for 1 hour in air. The calcined catalyst was exposed at a temperature of 200° C. to a stream of NH$_3$ (50 vol % NH$_3$/N$_2$; total gas hourly space velocity, GHSV, 3000 Nl/l.h) for 2 hours. After cooling, the catalyst was exposed to air and again exchanged with 1 M Ni(NO$_3$)$_2$ solution. The resulting catalyst was denoted Catalyst A. Catalyst A was further calcined, treated with NH$_3$ and then with 1 M Ni(NO$_3$)$_2$ to give Catalyst B.

Comparison Catalyst 1 was prepared from mordenite in the ammonium form (silica/alumina molar ratio 17) by ion exchange at a temperature of 90° C. with an aqueous solution containing 1 M nickel (II) acetate. The resulting material was dried for 16 h at 120° C. and subsequently calcined at 500° C. for 3 h in air to give Comparison Catalyst 1.

Comparison Catalyst 2 was prepared as described for Catalyst A but stopping after the initial calcination and before exposure to NH$_3$. Catalyst C was prepared by treating mordenite (in the ammonium form) with a silica/alumina molar ratio of 17 with a stream of diluted NH$_3$ (10 vol % NH$_3$ in He; GHSV 10.000–20.000 Nl/l.h) for 3 hours at room temperature. The resulting material was suspended in 1 M Ni(NO$_3$)$_2$ solution at room temperature. The temperature was gradually increased to a temperature between 70° and 90° C. and the temperature maintained for 10 hours. The catalyst was filtered and calcined at 450° C. in air and used as Catalyst C.

Catalyst D was prepared as described for Catalyst C but starting from zeolite Y (in the ammonium form) with a silica/alumina molar ratio of 6.4.

Catalyst E was prepared as described for Catalyst C but employing 1 M Co(NO$_3$)$_2$ in place of Ni(NO$_3$)$_2$.

Comparison Catalyst 3 was prepared as described for Catalyst C but omitting the NH$_3$ treatment and employing 1 M Co(NO$_3$)$_2$ in place of Ni(NO$_3$)$_2$.

The resulting metal loading of the above catalysts is given in Table 1 below:

TABLE 1

| Catalyst | wt % Ni | wt % Co | Ni/Al (mol/mol) | Co/Al (mol/mol) |
|---|---|---|---|---|
| A | 7.3 | — | 0.9 | — |
| B | 12.6 | — | 1.4 | — |
| C | 7.6 | — | 0.9 | — |
| D | 3.7 | — | 0.4 | — |

TABLE 1-continued

| Catalyst | wt % Ni | wt % Co | Ni/Al (mol/mol) | Co/Al (mol/mol) |
|---|---|---|---|---|
| E | — | 2.4 | — | 0.3 |
| Comparison Catalyst 1 | 9.0 | — | 0.96 | — |
| Comparison Catalyst 2 | 2.2 | — | 0.2 | — |
| Comparison Catalyst 3 | — | 1.6 | — | 0.2 |

EXAMPLE 2

Conversion of Ethene

The catalysts used in this example (Catalysts A and B and Comparison Catalysts 1 and 2) were initially calcined in 10 vol % at $O_2/N_2$ at 450° C. for 1 hour before use. The catalyst was loaded in a microflow reactor through which was passed a stream of ethene (diluted by helium) under the following operating conditions:

| | |
|---|---|
| Total pressure | 30 bar |
| Partial pressure ethene | 10 bar |
| Temperature | 220° C. |
| WHSV | 2.0 g/g · h |

The test results are given in Table 2, in which $C_{10}$ and $C_{15}$ represent conversion of ethene (expressed as weight % based on ethene feed) after a test duration of 10 and 15 hours respectively.

TABLE 2

| Catalyst | $C_{10}$ | $C_{15}$ |
|---|---|---|
| A | 20.1 | 18.7 |
| B | 27.3 | 24.2 |
| Comparison Catalyst 1 | 18.5 | 17.2 |
| Comparison Catalyst 2 | 5.6 | 4.4 |

It will be seen from the above results that both Catalysts A and B in accordance with the invention show increased conversion over Comparison Catalyst 1 (made by the conventional acetate route) and Comparison Catalyst 2 (made using nickel nitrate without ammonia treatment). Furthermore, the use of additional preparation steps in Catalyst B has considerably stepped up the catalyst activity.

EXAMPLE 3

Conversion of 1-butene

The catalysts used in this Example (Catalysts A, C, D and E and Comparison Catalysts 1 and 3) (after calcining at 450° C. in air for 16 h) were loaded in a microflow reactor heated in a helium stream to 450° C. After cooling to room temperature the reactor was pressurized and raised to reaction temperature. 1-Butene was then introduced diluted with He. Operating conditions were:

| | |
|---|---|
| Total pressure | 20 bar |
| Partial pressure 1-butene | 1.25 bar |
| Temperature | 200° C. |
| WHSV | see Table 3 below |

The test results are given in Table 3, in which $C_{10}$ and $C_{20}$ represent conversion of 1-butene (expressed as wt % based on butene feed) after a test duration of 10 and 20 hours respectively.

TABLE 3

| Catalyst | WHSV (g/g · h) | $C_{10}$ | $C_{20}$ |
|---|---|---|---|
| A | 2.5 | 23.5 | 19.6 |
| Comparison Catalyst 1 | 2.5 | 20.4 | 18.3 |
| C | 2.5 | 29.5 | 28.1 |
| D | 2.0 | 4.8 | 3.5 |
| E | 2.0 | 19.1 | 14.1 |
| Comparison Catalyst 3 | 2.0 | 15.2 | 12.0 |

What is claimed is:

1. A process for the preparation of a metal-containing zeolitic catalyst comprising the steps of exposing a zeolitic base material in the ammonium form to ammonia or a gaseous lower amine during a time sufficient to allow adsorption of said ammonia or amine to occur and contacting the zeolitic base material containing adsorbed ammonia or amine with an aqueous solution of a salt of the desired metal with a strong acid at an elevated temperature sufficient to release adsorbed ammonia or amine.

2. The process according to claim 1, wherein the zeolitic base material comprises a mordenite type zeolite.

3. The process according to any one of claims 1 or 2 wherein the zeolitic base material is exposed to ammonia for a time of from 1 to 5 hours at room temperature.

4. The process according to claims 1 or 2 wherein the metal is selected from Group I(b) or Group VIII of the Periodic Table of the Elements.

5. The process according to claims 1 or 2 wherein the salt is a nitrate.

6. The process according to claims 1 or 2 wherein contacting with the metal salt is carried out at a temperature of from 25° C. to 100° C. for a time of from 0.5 to 48 h.

7. The process according to claims 1 or 2 wherein the steps of exposure to ammonia or amine and contacting with a metal salt are carried out at least twice.

8. Metal-containing zeolitic catalysts when prepared by the process of any one of the preceding claims 1 or 2.

* * * * *